(12) United States Patent
Yagi (10) Patent No.: US 7,114,828 B2
(45) Date of Patent: Oct. 3, 2006

(54) VEHICULAR HEADLAMP

(75) Inventor: Seiichiro Yagi, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 44 days.

(21) Appl. No.: 10/786,488

(22) Filed: Feb. 25, 2004

(65) Prior Publication Data

US 2004/0174712 A1    Sep. 9, 2004

(30) Foreign Application Priority Data

Mar. 6, 2003  (JP)  ............................. 2003-059444

(51) Int. Cl.
*F21V 9/00* (2006.01)
*F21V 21/00* (2006.01)

(52) U.S. Cl. ...................... 362/231; 362/227; 362/507; 362/545

(58) Field of Classification Search ................ 362/231, 362/227, 507, 543, 544, 545
See application file for complete search history.

(56) References Cited

U.S. PATENT DOCUMENTS

| 5,796,094 | A  | * | 8/1998 | Schofield et al. ......... 250/208.1 |
| 6,406,172 | B1 | * | 6/2002 | Harbers et al. ............. 362/544 |
| 6,520,669 | B1 | * | 2/2003 | Chen et al. .................. 362/545 |
| 6,601,980 | B1 | * | 8/2003 | Kobayashi et al. ......... 362/510 |
| 6,877,879 | B1 | * | 4/2005 | Holz et al. .................. 362/259 |
| 6,909,376 | B1 | * | 6/2005 | Rennick ................... 340/693.6 |
| 2002/0075679 | A1 | * | 6/2002 | Machi et al. ............... 362/231 |
| 2002/0196639 | A1 | * | 12/2002 | Weidel ....................... 362/521 |
| 2003/0072167 | A1 | * | 4/2003 | Albou ........................ 362/543 |
| 2004/0233678 | A1 | * | 11/2004 | Ishida et al. ................ 362/539 |
| 2005/0018445 | A1 | * | 1/2005 | Sazuka et al. .............. 362/545 |
| 2005/0018446 | A1 | * | 1/2005 | Ishida ........................ 362/545 |

FOREIGN PATENT DOCUMENTS

| JP | 2001-229717 | 8/2001 |
| JP | 2002-219993 | 8/2002 |
| JP | 2002-219994 | 8/2002 |

OTHER PUBLICATIONS

Patent Abstracts of Japan; Publication No. 2001-229717 dated Aug. 24, 2001 (1 pg.).
Patent Abstracts of Japan; Publication No. 2002-219993 dated Aug. 6, 2002 (1 pg.).
Patent Abstracts of Japan; Publication No. 2002-219994 dated Aug. 6, 2002 (1 pg.).

* cited by examiner

*Primary Examiner*—Sandra O'Shea
*Assistant Examiner*—Jacob Y. Choi
(74) *Attorney, Agent, or Firm*—Osha Liang LLP (57) ABSTRACT

A vehicular headlamp used for a vehicle, includes an infrared light source for generating red light and infrared light, a visible light source for generating visible light whose wavelength is different from that of the red light, an optical system for emitting the red light and visible light towards a substantially same emission area in front of the vehicle and a lighting circuit for turning on the infrared light and visible light sources with the strength in order that the chromaticity in the emission area based on the red light and visible light can correspond to white light within a predetermined range in chromaticity coordinates.

4 Claims, 7 Drawing Sheets

VEHICULAR HEADLAMP

The present application claims priority from a Japanese Patent Application No. 2003-059444 filed on Mar. 6, 2003, the contents of which are incorporated herein by reference.

BACKGROUND OF THE INVENTION

1. Field of the Invention

The present invention relates to a vehicular headlamp. More particularly, the present invention relates to a vehicular headlamp used for a vehicle.

2. Related Art

Recently, the detection of obstacles in front of a vehicle such as an automobile or at the shoulder of the road by emitting infrared light has been discussed. In this case, by an infrared ray projector mounted on the vehicle emits the infrared light. In addition, a vehicular lamp including but not limited to, for example, a regular headlamp, a fog lamp and a cornering lamp of automobiles, motorcycles, trains and the like, a having a function of the infrared ray projector has been known as disclosed, for example, in Japanese Utility Model Application Publication No. 6-10880. In the light source of this vehicular lamp, a suitable number of infrared light LEDs are being mixed in addition to a visible light LED for emitting the light of a lamp light color.

The light source emitting the infrared light, however, might further emit red light besides the infrared light. In this case, the infrared ray projector may also emit the red light accompanying the emission of the infrared light.

Here, since the color of the red light is used as the lamp light color of, e.g. a brake lamp of a vehicle, the improper emission of the red light might be undesirable. Consequently, the infrared light might not be emitted properly in the prior art.

SUMMARY OF THE INVENTION

Therefore, it is an object of the present invention to provide a vehicular headlamp, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, a vehicular headlamp used for a vehicle, includes an infrared light source for generating red light and infrared light, a visible light source for generating visible light, of which the wavelength is different from that of the red light, an optical system for emitting the red light and visible light towards a substantially same emission area in front of the vehicle and a lighting circuit for turning on the infrared light and visible light sources with the strength in order that the chromaticity in the emission area based on the red light and visible light can correspond to white light within a predetermined range in chromaticity coordinates. The infrared light source may include a semiconductor infrared light emitting element for generating the red light and infrared light, and the visible light source may include a semiconductor white light emitting source for generating the white light.

The lighting circuit may turn on the infrared light and visible light sources with the strength in order that the X-coordinate of the chromaticity in the emission area can be within a range of 0.450 to 0.500 and the Y-coordinate thereof can be within a range of 0.380 to 0.440.

The lighting circuit may turn off the infrared light source, if the speed of the vehicle is lower than a predetermined level.

The vehicular lamp to which the present invention may be applied to includes, but not limited to, a regular headlamp, a fog lamp and a cornering lamp of automobiles, motorcycles, trains and the like.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
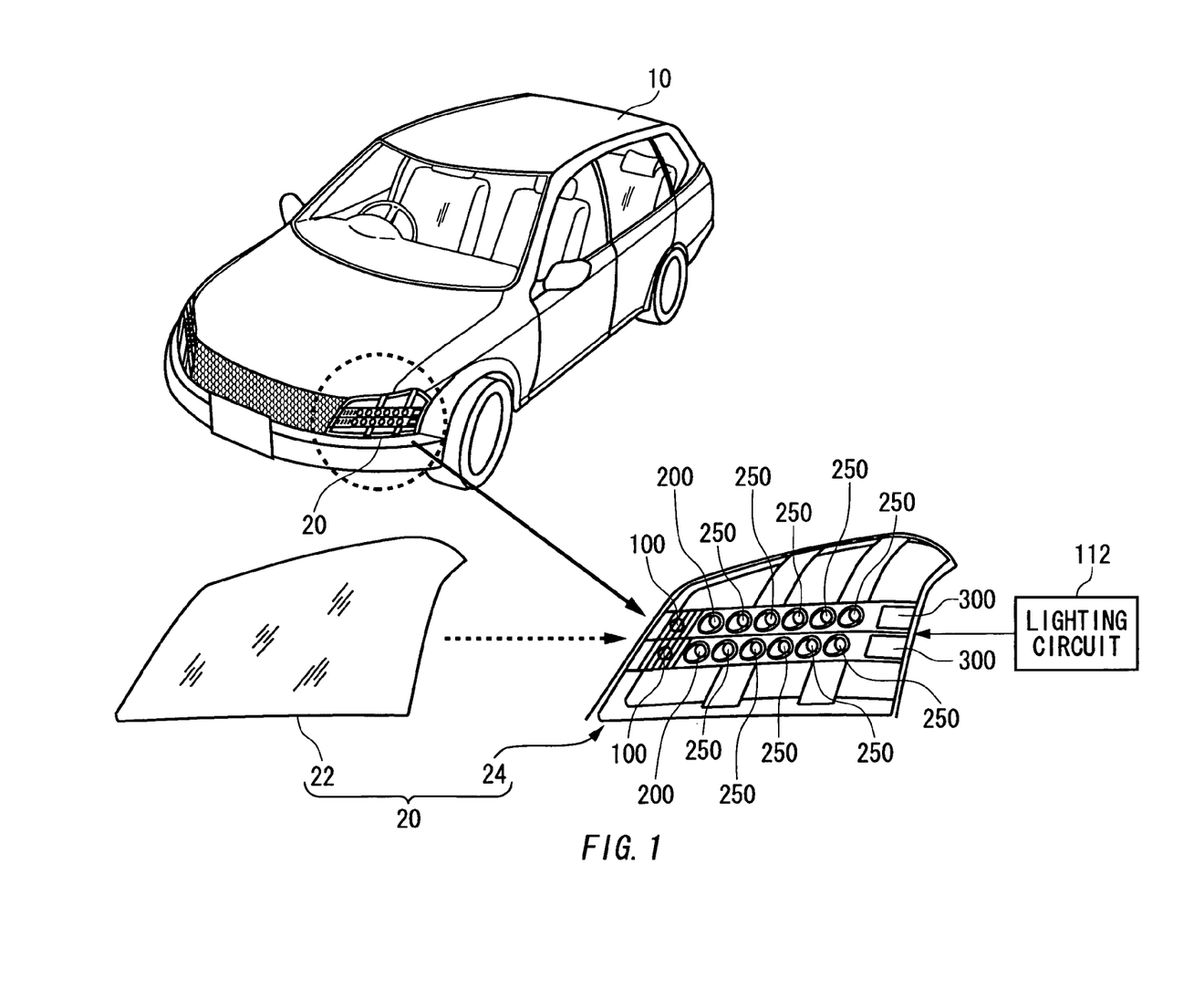
FIG. 1 shows an example of the configuration of a vehicular lamp 20 according to an exemplary embodiment of the present invention.

FIG. 1 shows an example of the configuration of a vehicular lamp 20 according to an exemplary embodiment of the present invention. It is the object of the present embodiment to provide a vehicular lamp 20 for properly emitting the infrared light forward from a vehicle.

In this embodiment, the vehicular lamp 20, which is a vehicular headlamp for low and high beam emissions attached to a vehicle such as an automobile, includes a plurality of infrared light source units 100, a plurality of white light source units 200 and 250, and a plurality of fog lamp light source units 300 in a lamp chamber formed of a transparent cover 22 and a lamp body 24. The vehicular lamp 20 contains the light source units 100, 200, 250 and 300 in the lamp chamber in order that the light axis when the vehicular lamp 20 is attached to a vehicle body can be inclined downwards by 0.3 to 0.6 degrees against the front and back direction of the vehicle.

In addition, the vehicular lamp 20 forms a predetermined light distribution pattern based on the light emitted by the light source units 100, 200, 250 and 300 forward from a vehicle. In this case, the infrared light source units 100 emit the infrared light forward from the vehicle. The white light source units 200 and 250 emit the white light forward from the vehicle. And, the fog lamp light source units 300 emit the yellow light forward from the vehicle. Each of the light source units 100, 200, 250 and 300 generates the light corresponding to the power received from a lighting circuit 112 provided in the vehicular lamp 20.

Furthermore, in this embodiment, the white light source units 200 adjacent to the infrared light source units 100 can be used to lessen the red light emitted by the infrared light source units 100 accompanying the emission of the infrared light. In addition, the other white light source units 250 are used to form the light distribution patterns for the low and high beams. The plurality of white light source unit 250 may have the same or similar light distribution characteristics as or to each other or may have different light distribution characteristics from each other.

Figure 2:
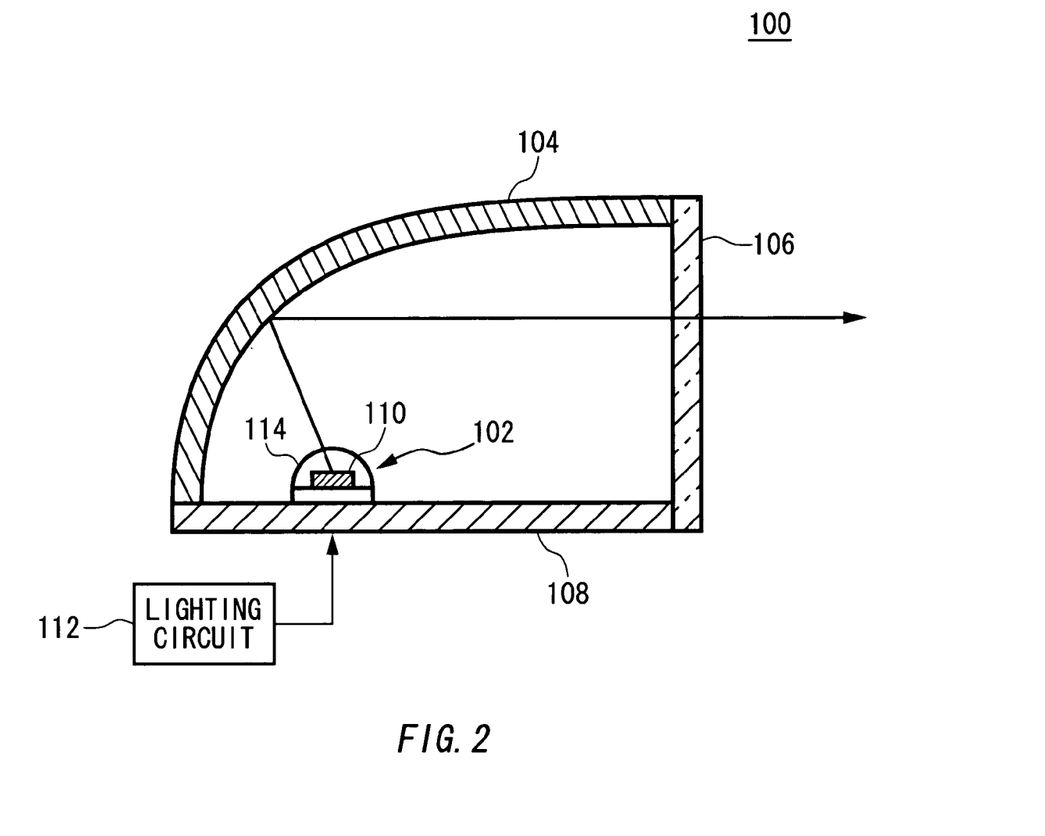
FIG. 2 shows an example of the configuration of an infrared light source unit 100.

FIG. 2 shows an example of the configuration of the infrared light source unit 100. The infrared light source unit 100 includes a bottom part 108, a translucent cover 106, an infrared light source 102, and a reflector 104.

The bottom part 108, which is a plate-like material, holds the infrared light source 102 on its upper surface. The translucent cover 106, which is a translucent and transparent material for covering the front face of the infrared light source unit 100, passes through the light reflected by the reflector 104 forward from the infrared light source unit 100.

The infrared light source 102, which is a light emitting diode module mounted on the bottom part 108, includes an infrared light LED 110 and a mold 114. The infrared light LED 110, which is an example of a semiconductor light emitting element, generates the red light and the infrared light corresponding to the power received from the lighting circuit 112 disposed outside the infrared light source unit 100. The infrared light LED 110 may generate near-infrared light of about 770 nm to 1 μm in wavelength as the infrared light.

The mold 114, which is a seal member formed of, e.g. translucent resin to cover the infrared light LED 110, passes though the red light and infrared light generated by the infrared light source 102 outwards from the infrared light source 102. Accordingly, the infrared light source 102 generates the red light and the infrared light. Furthermore, the red light is, e.g. the visible light of about 630 nm in wavelength, which occurs accompanying the generation of the near-infrared light.

Here in the present embodiment, the lighting circuit 112 is provided to the plurality of light source units 100, 200, 250 and 300 (cf. FIG. 1) in common. In another embodiment, the vehicular lamp 20 (cf. FIG. 1) may include lighting circuits 112 provided to each of the light source units 100, 200, 250 and 300 respectively. In this case, the lighting circuits 112 may be provided in lamp chambers corresponding to each of the light source units 100, 200, 250 and 300.

The reflector 104 having a shape like a part of, e.g. a parabolic face is provided extending from the back of the infrared light source 102 towards the upper front thereof to cover the infrared light source 102. Due to this, the reflector 104 reflects the red light and the infrared light generated by the infrared light source 102 forward from the infrared light source 102. The reflector 104 reflects the red light and the infrared light forward from the vehicle as substantially parallel rays.

In this embodiment, the infrared light source unit 100 has a function of an infrared ray projector for emitting the infrared light forward. Here, the automobile 10 (cf. FIG. 1) includes an infrared ray camera such as a CCD camera for detecting the infrared light so as to perform the detection of obstacles in an invisible area, in front of the vehicle, or at the shoulder of the road.

Furthermore, the reflector 104 may have the optical center that is, e.g. the focus or the reference point in optical design near the infrared light source 102. In this case, the reflector 104 can reflect the red light and the infrared light generated by the infrared light source 102 highly accurately.

In addition, the reflector 104 may have a light distribution step to obtain the light distribution pattern of a predetermined boundary between bright and dark. In this case, the red light and infrared light can be properly emitted towards the desired area.

Here, the light distribution step, which is a part of the reflector 104 sectioned to be shaped like a rectangle or diagonally slanted trapezoid, is formed of, e.g. a hyperbolic and parabolic face that is set corresponding to the shape of the boundary between bright and dark of the light distribution pattern supposed to be formed at each position on the parabolic face. Here, the hyperbolic and parabolic face is the same as or similar to a curved face formed of parabolas whose substantially vertical cross-section becomes wider towards the front of the infrared light source unit 100 and whose substantially horizontal cross-section becomes wider towards the back of the infrared light source unit 100.

Figure 3:
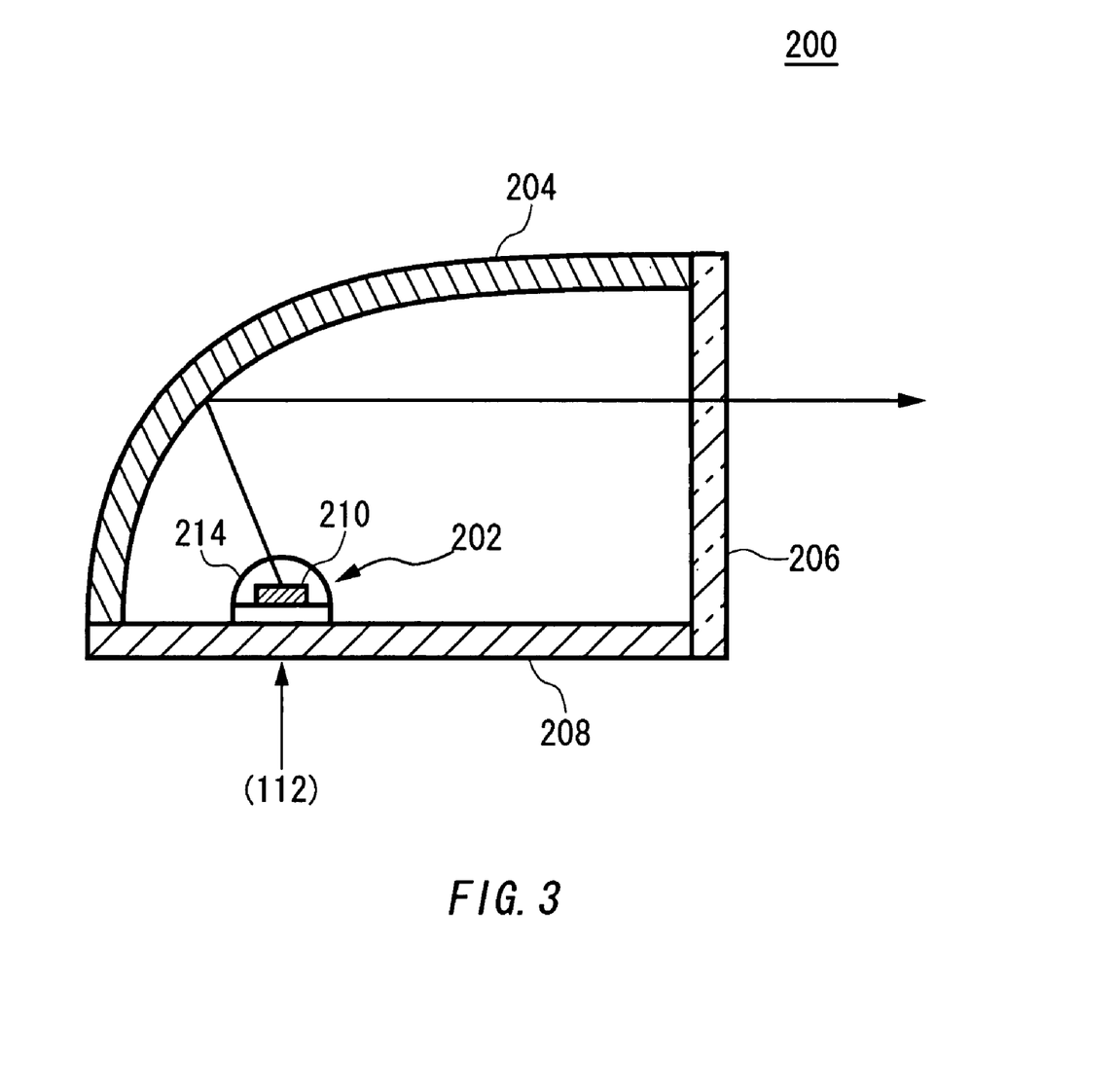
FIG. 3 shows an example of the configuration of a white light source unit 200.

FIG. 3 shows an example of the configuration of the white light source unit 200. The white light source unit 200 includes a white light source 202, a bottom part 208, a translucent cover 206, and a reflector 204.

The white light source 202, which is a light emitting diode module mounted on the bottom part 208, includes a white light LED 210 and a mold 214. The white light LED 210, which is an example of a semiconductor light emitting element, generates the white light that is an example of the visible light whose wavelength is different from that of the red light corresponding to the power received from the lighting circuit 112. In addition, the mold 214, which is a seal member formed of, e.g. translucent resin to cover the white light LED 210, passes through the white light generated by the white light LED 210 outwards from the white light source 202. Accordingly, the white light source 202 generates the white light.

In this embodiment, the white light source unit 200 includes a white light source 202 as an alternative to the infrared light source 102 (cf. FIG. 2), and has the same or similar function as or to the infrared light source unit 100 (cf. FIG. 2). Each of the bottom part 208, the translucent cover 206 and the reflector 204 has the same or similar function as or to the bottom part 108, the translucent cover 106 and the reflector 104 respectively. Accordingly, the white light source unit 200 emits the white light towards approximately the same area as that to which the infrared light source unit 100 emits the red light and the infrared light. In this case, the reflector 104 (cf. FIG. 2) and the reflector 204 have a function of an optical system for emitting the red light and the white light towards approximately the same area in front of the automobile 10.

Here, when the red light is emitted forward from the automobile 10 (cf. FIG. 1), another automobile facing the automobile might mistake this red light for the red light of, e.g. a brake lamp or tail lamp. Accordingly, the emission of the red light from a vehicle is undesirable in terms of security and also regulated by laws. In the present embodiment, however, the white light source unit 200 emits the white light substantially added to the infrared light emitted by the infrared light source unit 100. In this case, the chromaticity emitted by the vehicular lamp 20 (cf. FIG. 1) is adjusted by mixing the red light with the white light, so that the red light can be properly lessened in front of the automobile 10. Therefore, in the present invention, although the red light is generated by the infrared light source 102 accompanying the infrared light, the infrared light can be emitted forward from the vehicle securely and properly.

Furthermore, when the red light generated by the infrared light source 102 is reduced by using, e.g. a translucent film such as a filter, this translucent film might undesirably reduce the infrared light whose wavelength is close to the red light significantly. In this embodiment, however, the chromaticity of the light is adjusted by further adding other visible light to the red light, so that the red light can be properly lessened without reducing the infrared light. Particularly, if using a semiconductor light emitting element having a predetermined peak wavelength such as a light emitting diode as a light source for the infrared light and other visible light supposed to be added thereto, it is possible to properly combine the red light and the other visible light.

In another embodiment, the white light source unit 200 may further emit other visible light in addition to the white light. For example, the white light source unit 200 may further emit the light of cyan color which is the complementary color of the red color. In this case, the red light can be further properly lessened. The white light source unit 200 may further include a light source for generating the light of cyan color.

And in further another embodiment, the vehicular lamp 20 may include a light source unit for emitting the visible light other than the white light such as green as an alternative to the white light source unit 200. In this case, the light source unit includes a light source for generating the visible light, and thereby lessens the red light emitted by the infrared light source unit 100. The light source unit may emit, e.g. the light of cyan color as this visible light.

Figure 4:
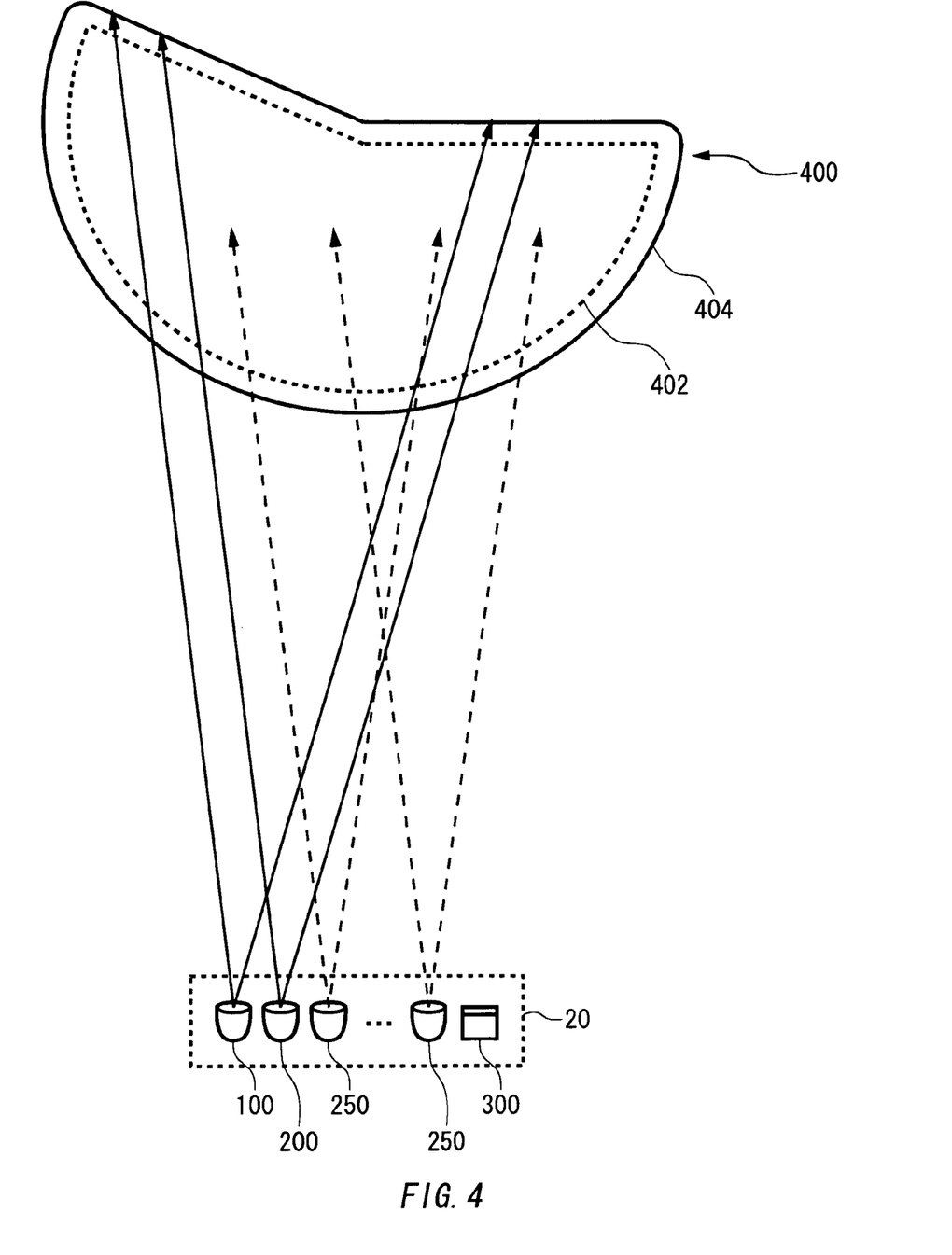
FIG. 4 shows an example of a light distribution pattern 400.

FIG. 4 shows an example of the light distribution pattern 400 formed by the vehicular lamp 20. The light distribution pattern 400 is formed on a vertically virtual screen disposed 25 meters forward from a vehicular lamp 20. The vehicular lamp 20 forms a low beam pattern 402 and an infrared light pattern 404 as an example of the light distribution pattern 400.

The white light source units 250 form the low beam pattern 402 having a cut line which is the boundary between bright and dark in the horizontal and predetermined inclined directions by emitting the white light forward. The white light source units 250 projects the edge shape of a shade which is a light shielding member provided in the white light source units 250 forward in order to form the cut line.

In addition, the infrared light source units 100 and the white light source units 200 form the infrared light pattern 404 at a predetermined emission area surrounding the low beam pattern 402. In this embodiment, the infrared light source units 100 emit the red light and the infrared light towards the emission area. And, the white light source units 200 emit the white light of enough strength to lessen the red light towards the same emission area. In this case, the white light source units 200 may emit the white light weaker than that of the white light source units 250.

In this case, the lighting circuit 112 (cf. FIGS. 2 and 3) turns on the infrared light source 102 (cf. FIG. 2) and the white light source 202 (cf. FIG. 3) with particular strength in order that the chromaticity in the emission area based on the red light and the white light can correspond to the white light within a predetermined range in the chromaticity coordinates. Accordingly, in the present embodiment, the red light can be properly removed or reduced in front of the automobile 10. In addition, the infrared light can be properly emitted.

Here, if the speed of the automobile 10 (cf. FIG. 1) is lower than a predetermined level such that the automobile 10 is stopped, the lighting circuit 112 turns off the infrared light source 102 by stopping supplying power to the infrared light source 102. In this case, the infrared light can be prevented from being repeatedly emitted towards, e.g. the eyes of a pedestrian. In addition, due to this, the infrared light can be emitted further securely. And, the vehicular lamp 20 may form a fog lamp pattern based on the yellow light generated by the fog lamp light source units 300 as a part of the light distribution pattern 400.

Figure 5:
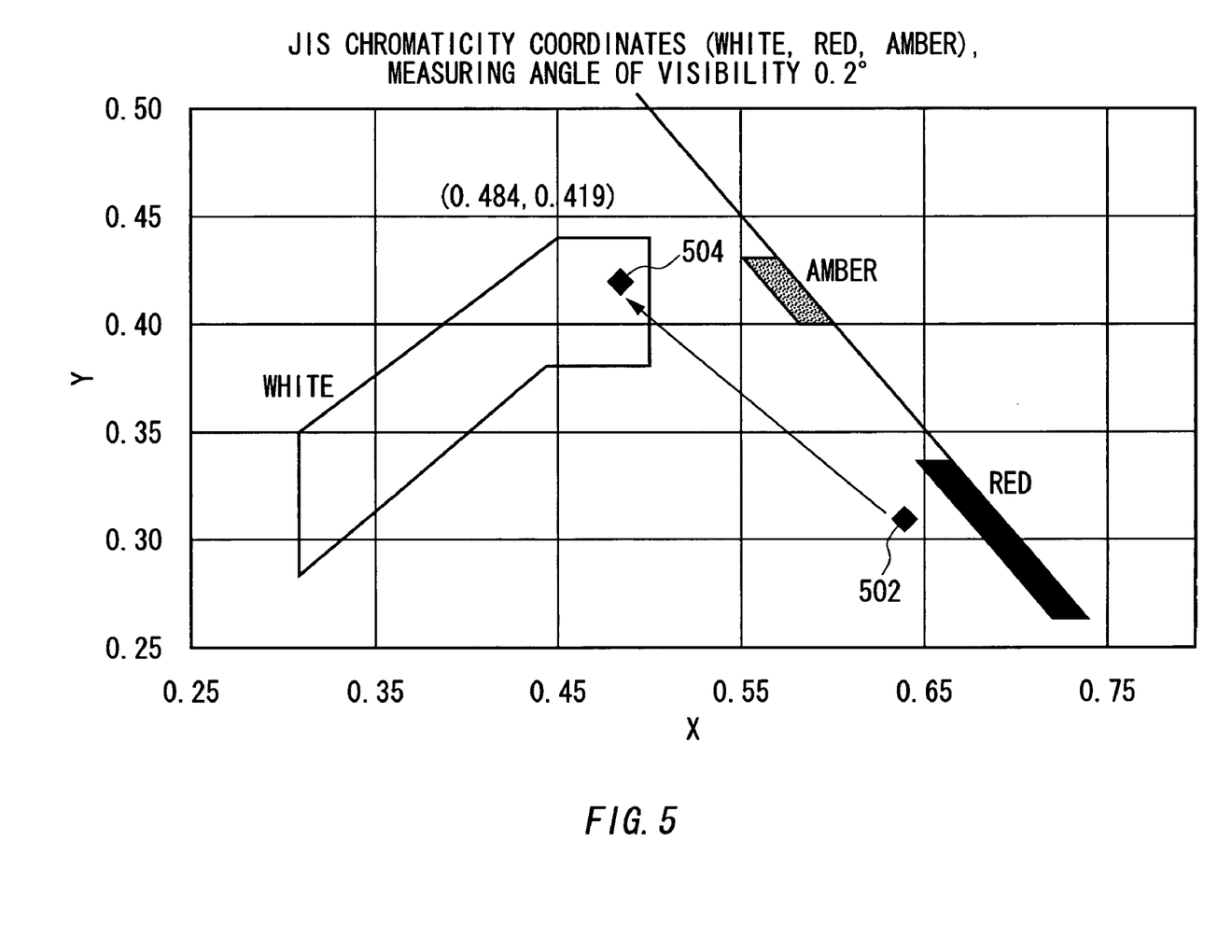
FIG. 5 shows chromaticity coordinates depicting the chromaticity of an infrared light pattern 404.

FIG. 5 shows the chromaticity coordinates depicting the chromaticity of the infrared light pattern 404. The points 502 and 504 indicate the chromaticity of the emission area formed by the infrared light pattern 404 in both cases that the white light source units 200 are turned on or not respectively. When only the infrared light source units 100 are turned on with the white light source units 200 turned off, the infrared light pattern 404 corresponding to the point 502 close to red is formed on the basis of the red light emitted by the infrared light source units 100.

On the other hand, when the infrared light source units 100 and the white light source units 200 are turned on altogether, the white light source units 200 lessens the red light caused by the infrared light source units 100 by the white light. Accordingly, the infrared light pattern 404 is formed by the white light of the chromaticity corresponding to the point 504 based on the red light and white light emitted by the infrared light source units 100 and the white light source units 200. In the present embodiment, the X-coordinate of the point 504 is 0.484, and the Y-coordinate is 0.419.

The lighting circuit unit 112 turns on the infrared light source 102 and the white light source 202 with the strength in order that the X-coordinate of the chromaticity in the emission area can be 0.450 to 0.500 and the Y-coordinate thereof can be 0.380 to 0.440. In this case, since the light of red or amber color is not emitted forward from the automobile 10, another automobile facing the automobile 10 can be prevented from mistaking the vehicular lamp 20 for a brake lamp or tail lamp.

In addition, humans feel incompatibility to sense colors in their eyes right after their eyes receive the red light, and thus pedestrians might be in danger if the red light is emitted towards their eyes. In the present embodiment, however, the chromaticity of the infrared light pattern 404 is adjusted, and thereby the red light can be prevented from being emitted towards the eyes of pedestrians. Accordingly, high security can be guaranteed. According to the present embodiment, it is possible to form the infrared light pattern 404 of proper chromaticity.

Figure 6:
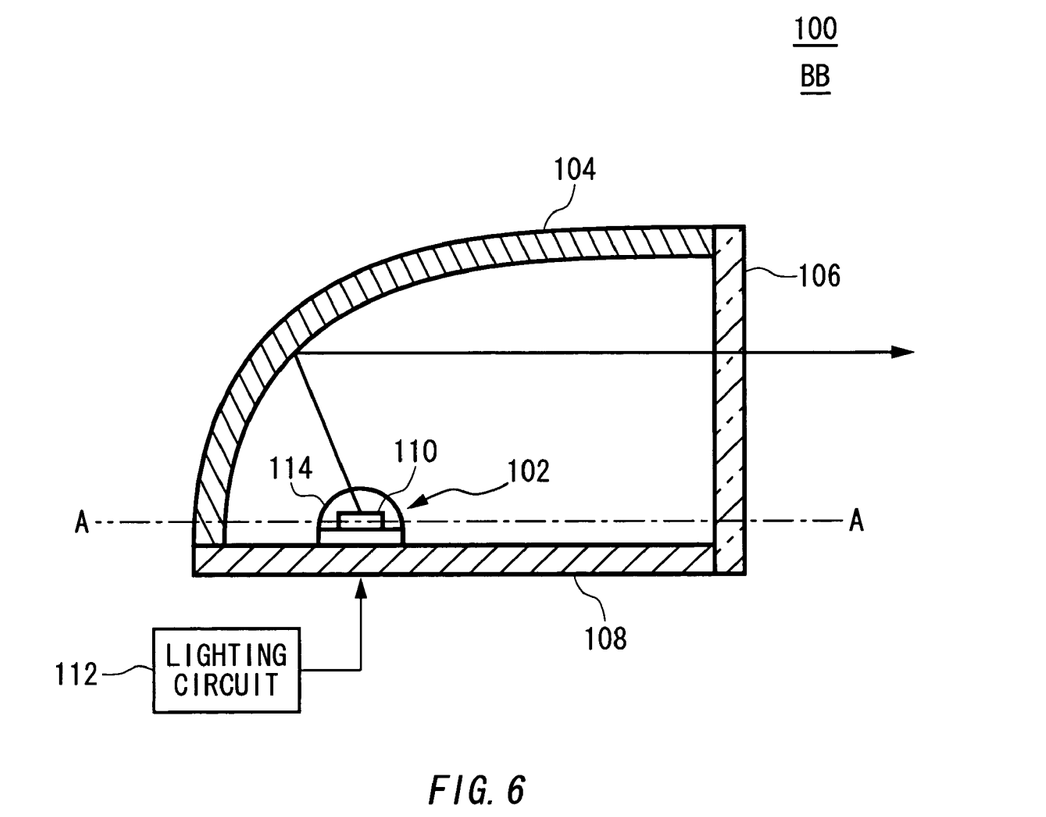
FIG. 6 is a vertically cross-sectional view BB of an infrared light source unit 100.
Figure 7:
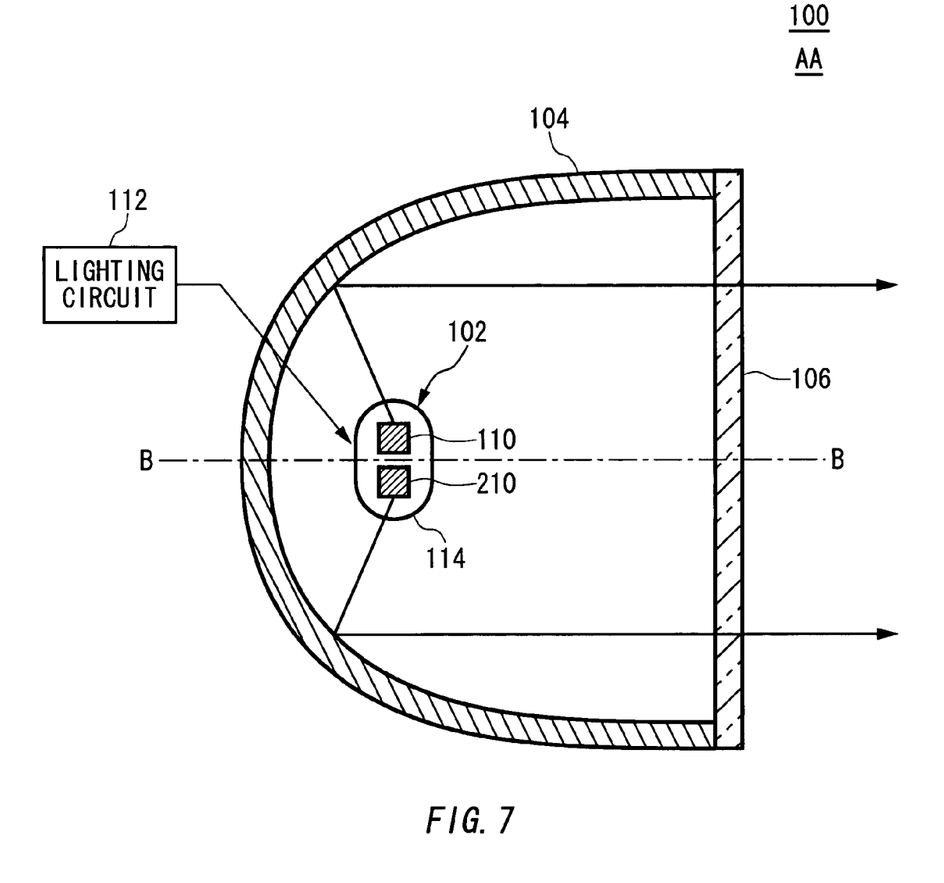
FIG. 7 is a horizontally cross-sectional view AA of an infrared light source unit 100.

FIGS. 6 and 7 show another example of the configuration of the infrared light source unit 100. FIG. 6 is a vertically cross-sectional view BB of the infrared light source unit 100. FIG. 7 is a horizontally cross-sectional view AA of the infrared light source unit 100. In this embodiment, the infrared light source 102 further includes a white light LED 210. The white light LED 210 is arranged being adjacent to the infrared light LED 110 to have a space of less than or equal to 0.2 mm there between. The surfaces of the infrared light LED 110 and the white light LED 210 may be about 1 mm in size. And, in the present embodiment, the mold 114 seals the infrared light LED 110 and the white light LED 210 integrally.

In this case, the infrared light source 102 further has a function of the white light source for generating the white light. In addition, the infrared light LED 110 and the white light LED 210 are arranged being adjacent to each other, and thereby the reflector 104 has a function of an optical system for emitting the red light and the white light towards substantially the same emission area in front of the automobile 10 (cf. FIG. 1). In this case, the white light LED 210 lessens the red light generated by the infrared light LED 110 by the generated white light.

Accordingly, also in the present embodiment, the red light accompanying the emission of the infrared light can be properly lessened. According to the present embodiment, the infrared light can be emitted securely and properly. Furthermore, except the points mentioned above, the configuration in relation to FIGS. 6 and 7 given the same symbols as those in FIGS. 2 and 3 will not be described because it has the same function as that in FIGS. 2 and 3.

In addition, in another embodiment, the infrared light LED 110 and the white light LED 210 may be sealed by different molds respectively. In this case, the infrared light source units 100 may include a plurality of light sources each of which includes the infrared light LED 110 and the white light LED 210.

As is obvious from the description above, according to the present invention, it is possible to emit the infrared light properly.

Although the present invention has been described by way of exemplary embodiments, it should be understood that those skilled in the art might make many changes and substitutions without departing from the spirit and the scope of the present invention which is defined only by the appended claims. For example, the vehicular lamp to which the present invention may be applied to includes, but not limited to, a regular headlamp, a fog lamp and a cornering lamp of automobiles, motorcycles, trains and the like.

What is claimed is:

1. A vehicular headlamp used for a vehicle, comprising:
an infrared light source for generating red light and infrared light, wherein the infrared light source comprises a semiconductor infrared light emitting element for generating red light and infrared light;
a visible light source for generating visible light, wherein the visible light source comprises a semiconductor light emitting element which emits light having wavelengths different from that of said red light;
an optical system for directing said red light and visible light towards a substantially same emission area in front of said vehicle; and
a lighting circuit for turning on said infrared light and visible light sources with strength in order that chromaticity in said emission area based on said red light and visible light can correspond to white light within a predetermined range in chromaticity coordinates,
wherein the optical system comprises a reflector for reflecting the light emitted from the infrared light source and the light emitted from the visible light emitting element towards the substantially same emitting area in front of the vehicle, and wherein the infrared light source and the visible light source are located in the vicinity of a common focal point of the reflector.

2. A vehicular headlamp as claimed in claim 1, wherein said lighting circuit turns on said infrared light and visible light sources with strength in order that an X-coordinate of said chromaticity in said emission area can be within a range of 0.450 to 0.500 and a Y-coordinate thereof can be within a range of 0.380 to 0.440.

3. A vehicular headlamp as claimed in claim 1, wherein said lighting circuit turns off said infrared light source, if speed of said vehicle is lower than a predetermined level.

4. A vehicular headlamp as claimed in claim 1, wherein the semiconductor infrared light emitting element and the semiconductor visible light emitting element are arranged adjacent to each other.

* * * * *